United States Patent [19]
Welker

[11] Patent Number: 6,085,777
[45] Date of Patent: Jul. 11, 2000

[54] DUAL CYLINDER INSERTION APPARATUS

[75] Inventor: Brian H. Welker, Sugar Land, Tex.

[73] Assignee: Welker Engineering Company, Sugar Land, Tex.

[21] Appl. No.: 09/026,200

[22] Filed: Feb. 19, 1998

[51] Int. Cl.⁷ ................................................. F16K 31/124
[52] U.S. Cl. .................. 137/317; 73/863.01; 73/863.81; 73/863.86; 251/31; 251/62
[58] Field of Search ............................ 73/863.01, 863.81, 73/863.86; 137/317, 318; 251/31, 62, 63.5

[56] References Cited

U.S. PATENT DOCUMENTS

| | | | |
|---|---|---|---|
| 2,091,613 | 8/1937 | Polston | 73/863.85 |
| 2,870,629 | 1/1959 | Willis | 137/318 |
| 3,833,020 | 9/1974 | Smith | 137/318 |
| 3,863,667 | 2/1975 | Ward | 137/318 |
| 3,867,964 | 2/1975 | Gardner | 137/318 |
| 4,218,918 | 8/1980 | Ueno et al. | 73/863.01 |
| 4,345,613 | 8/1982 | Mills et al. | 137/317 |
| 4,346,611 | 8/1982 | Welker | 73/863.86 |
| 4,479,393 | 10/1984 | Shores | 73/863.86 |
| 5,186,199 | 2/1993 | Murphy et al. | 137/318 |

Primary Examiner—George L. Walton
Attorney, Agent, or Firm—Herzog, Crebs & McGhee, LLP

[57] ABSTRACT

A probe structure for inserting into and operating upon an object within a pipeline, especially a high pressure pipeline carrying liquid or gas, is characterized by two coaxial cylinders that can be either pneumatically or hydraulically actuated. A primary cylinder is adapted to be mounted onto a pipeline tee and/or valve, and includes a movable primary piston to which is fixedly attached a primary lower hollow shaft that moves with the primary piston and preferably a primary upper hollow shaft that also moves with the primary piston. The primary lower hollow shaft is adapted to selectively extend into the pipeline while the primary upper hollow shaft extends above the primary cylinder and is fixed to a secondary cylinder, such that the secondary cylinder moves with the primary piston. The secondary piston includes a secondary piston that moves independently of the first and second cylinders. A secondary hollow shaft is fixedly attached to the secondary piston and coaxially extends through the primary upper and lower hollow shaft, and a central bore in the primary piston, and is adapted to selectively extend into the pipeline. In this manner, an object attached to the primary lower hollow shaft may be inserted into the pipeline, while the secondary hollow shaft provides for a second operation to be performed on the object. Wires may extend through the secondary hollow shaft or air may be circulated therethrough for pneumatic purposes.

9 Claims, 2 Drawing Sheets

DUAL CYLINDER INSERTION APPARATUS

BACKGROUND OF THE DISCLOSURE

1. Field of the Invention

The present invention relates to insertion apparatuses for placing various devices into a pipeline of flowing gaseous or liquid products and, more particularly, to insertion apparatuses for the insertion and manipulation and/or operation of various devices within the pipeline.

2. Description of the Prior Art

Pipelines carry flowing gaseous or liquid product from one place to another. In many instances it is desirable, if not necessary, to measure, sample or generate data from such flowing product. It is also desirable to control flow such as by regulators or valves. This measurement or flow control can be accomplished by inserting a measuring device, sensor, valve, plug, or various other types of devices into the flow of product within the pipeline. In order to enable such insertion, pipelines are normally fitted with tees. The tees provide an opening into the pipeline and generally a mounting flange or fitting.

One exemplary type of measurement is flow volume as measurable by a turbine flow meter. Another type of measurement is pressure as measurable by a pressure sensor. Since the total value of the product flowing within the pipeline is, in part, dependent on the temperature of the flowing material, sometimes a thermometer is utilized. Still other types of device that requires insertion into the pipeline, are sampler devices, regulator valves, orifices and flow diffusers.

It is known to be able to insert such devices into the pipeline by using an insertion apparatus, even under pressure conditions, through a tee. The insertion apparatus is mounted onto the mounting flange or fitting of the tee. The device to be inserted is carried by the insertion apparatus for selective insertion into the pipeline through the tee.

Such an insertion apparatus is described in U.S. Pat. No. 4,177,676 issued to Robert H. Welker on Dec. 11, 1979. The '676 patent describes a hydraulically operated meter mounting mechanism that is adapted to insert and position a meter transducer in a high pressure environment such as a pipeline. The meter mounting mechanism utilizes a single, movable piston structure having a central, hollow piston rod that reciprocates within the cylinder portion of the piston structure. The piston rod extends beyond the cylinder portion and carries the meter transducer. Wires from the meter transducer may be fed through the piston rod. The piston rod may be selectively locked against rotation by a locking mechanism.

Another insertion apparatus is described in U.S. Pat. No. 4,346,611 issued to Robert H. Welker on Aug. 31, 1982. The '611 patent describes an insertion apparatus especially adapted to insert a probe into the pipeline. The insertion apparatus includes a single cylinder/piston arrangement to which is coupled a piston rod. The probe is attached to one end of the piston rod external of the cylinder. Pressure from the pipeline is directed into the piston to position the probe into the pipeline.

Still another insertion apparatus is described in U.S. Pat. No. 4,631,967 issued to Robert H. Welker on Dec. 30, 1986. The '967 patent describes an automatic insertion apparatus that will insert a portion of a piston rod into a pressurized fluid pipeline, usually an end of the piston rod to which is attached a measuring device. The piston rod is actuated by a single cylinder/piston, mounted on the pipeline. Reciprocating movement of the piston rod selectively places the measuring device into the pressurized fluid pipeline flow.

While there are examples in the prior art of insertion apparatuses, such apparatuses perform only a single task, namely, the simple insertion and retraction of the measuring device or sensor into and from the pipeline. There are times where it may be desirable to perform another task once the device or sensor has been inserted into or retracted from the pipeline. For instance, it may be necessary to insert then expand a plug in the pipeline in order to stop or control product flow. Additionally, it may be necessary to insert a device such as a miniature video camera into the pipeline, then activate a switch on the device or perform another function relative to the device. Also, it may be desirable to insert a capsule device, having a protective capsule around a sensitive device, into the pipeline, then open the capsule to expose the device.

In order to perform a "dual" task or operation, the prior art utilized a hand crank device to insert a device into the pipeline and then perform the next operation. Such is not efficient and does not allow for remote control, which for safety reasons is often desirable.

It is thus an abject of the present invention to provide an insertion device that is capable of performing two independent operations, insertion/retraction and then manipulation once inserted.

SUMMARY OF THE INVENTION

A pipeline insertion/probe device is adapted to perform a first and second operation upon an inserted object. The insertion device is characterized by a dual coaxial cylinder/piston structure with dual coaxial, reciprocating hollow shafts. The shafts may be actuated by their respective pistons independently of each other. A primary cylinder and piston structure carries an object to be inserted into the pipeline by its shaft, while a secondary cylinder and piston structure allows a second operation on the inserted object through its shaft. The secondary cylinder and piston structure is coupled to and carried by the primary piston to move therewith.

More particularly, the primary cylinder, adapted to be attached to a pipeline, has a first hollow shaft that is fixedly attached to the primary piston, and is adapted to extend into the interior of the pipeline upon selective movement of the primary piston. The first hollow shaft is retractable from the interior of the pipeline upon selective movement of the primary piston. The secondary cylinder is fixedly attached to the primary piston by a second hollow shaft that extends from the primary cylinder housing. Thus, the secondary cylinder and piston moves with the primary piston. A third hollow shaft is attached to the secondary piston and extends through and is coaxial with the first and second hollow shafts and a bore in the primary piston. In this manner, while the secondary cylinder is carried by and moves with the primary piston, the secondary piston controls the movement of the third hollow shaft.

Alternately, the secondary piston could serve as the holder/insertion tool and the primary piston could perform the later manipulation.

In a further modification, the second hollow shaft is stationary and the first hollow shaft moves on the third hollow shaft.

In accordance with an aspect of the present invention, the cylinders are adapted to be actuated pneumatically or hydraulically, either through external means or by use of the pipeline pressure.

BRIEF DESCRIPTION OF THE DRAWINGS

So that the manner in which the above recited features, advantages and objects of the present invention are attained can be understood in detail, a more particular description of the invention briefly summarized above, may be had by reference to the exemplary preferred embodiment thereof which is illustrated in the appended drawings, wherein.

Figure 1:
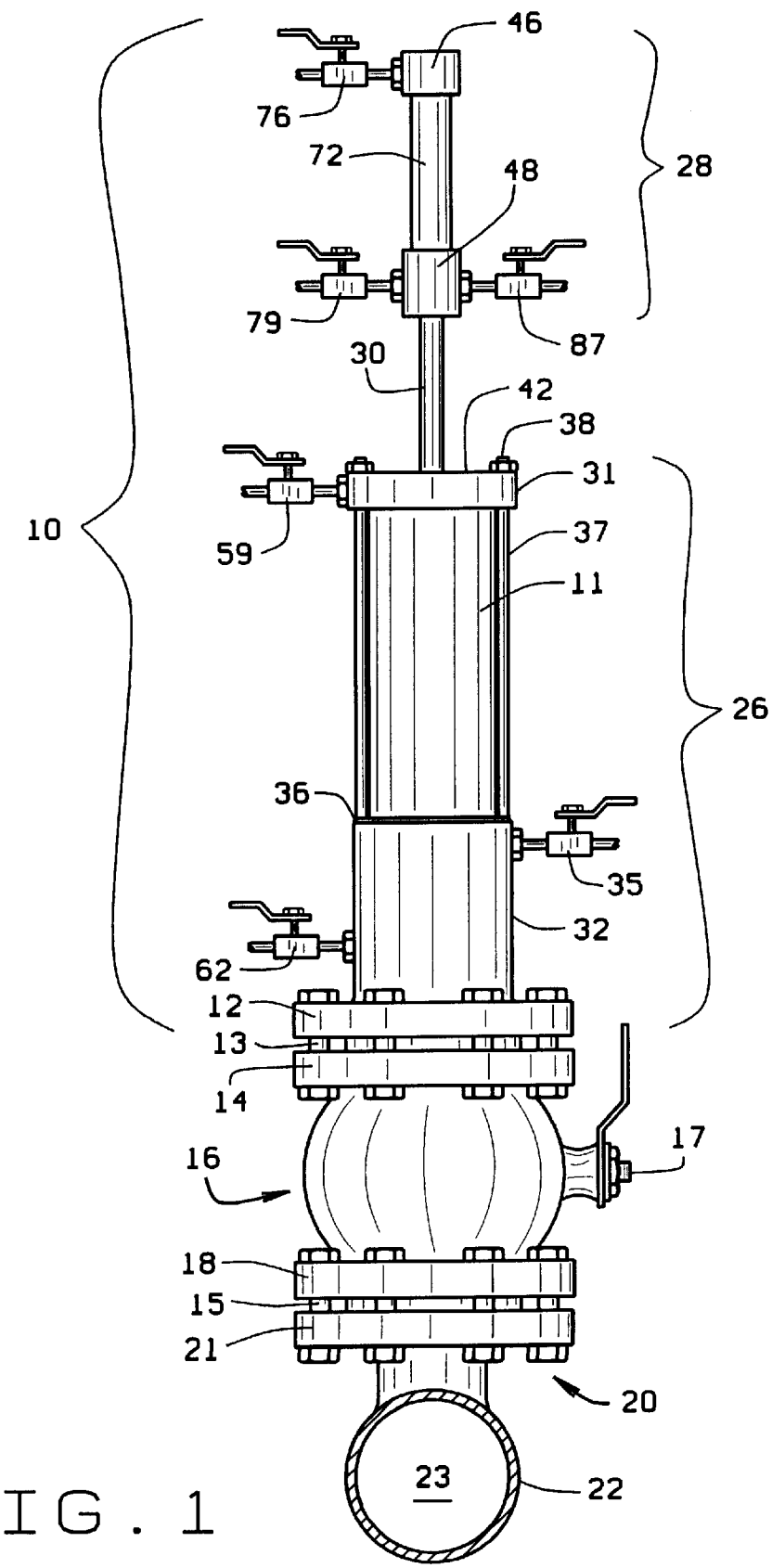
FIG. 1 is a front elevation view of the present dual cylinder insertion device mounted onto a valve that is attached onto a tee of a pipeline.

It is to be noted, however, that the appended drawings illustrate only a preferred embodiment of the invention. The drawings are therefore not to be considered the exclusive or only Version or unduly limiting. The invention may admit to other equally effective structurally or functionally equivalent embodiments within the broad scope of the claims.

DESCRIPTION OF THE PREFERRED EMBODIMENT

Referring to the Figures, there is depicted the present dual cylinder/probe insertion device generally designated 10. The dual cylinder insertion device 10 includes a first, primary, or lower cylinder structure 26 and a second, secondary, or upper cylinder structure 28. It should be generally understood that the preferential material for most of the present dual cylinder insertion device 10 is a metal such as steel, however, other suitable materials may be used. The secondary cylinder structure 28 is operably coupled to the primary cylinder structure 26 by a hollow shaft 30.

The primary cylinder structure 26 includes a primary housing 11 retained between an upper cylinder head 31 and a lower cylinder head 32. A series of bolts 37 extend through bores (not shown) in the upper cylinder head 31, project axially along the exterior of the primary housing 11, and are threadedly received in threaded bores (not shown) in the lower cylinder head 32. Nuts 38, placed on the threaded ends of the bolts 37 that extend axially beyond the upper surface 42 of the upper cylinder head 31, are used to axially compress the primary housing 11 between the upper and lower cylinder heads 31 and 32.

The lower cylinder head 32 has an integral, radially outwardly extending mounting flange 12 adapted to be coupled via a plurality of bolts 13 to a like radially outwardly extending upper mounting flange 14 of a valve 16. The valve 16 is typically a ball valve, the construction of which is well known to those skilled in the art. However, it should be understood that the valve may be a gate valve or any other type of valve generally used in the oil and gas industry which has an axial bore through the center thereof. The valve 16 has an axial bore therethrough (not shown) that is opened and closed through movement of a handle 17. The valve 16 further includes a radially outwardly extending lower mounting flange 18 that is adapted to be coupled via a plurality of bolts 15 to a like radially outwardly extending mounting flange 21 of a tee 20. The tee 20 is attached to a pipeline 22 in a known manner and includes an axial bore (not shown) to allow communication between the interior 23 of the pipeline 20 and the valve 16.

The valve and tee arrangement as described above is a standard arrangement known in the pipeline industry for allowing access to the interior or contents of a pipeline. It should be understood that other arrangements are possible and usable with the present structure 10.

The secondary cylinder structure 28 includes a secondary housing 72 retained between an upper cylinder head 46 and a lower cylinder head 48. The cylinder heads 46, 48 may be affixed upon the respective ends of the secondary housing 72 in any suitable manner such as by adhesive or a complementary threading system. As indicated above, secondary cylinder structure 28 moves with respect to the primary cylinder structure 26 by shaft 30 and thus forms the dual cylinder insertion device 10. However, the secondary cylinder 28 and shaft 30 could be made stationary by sealing and threading them into upper cylinder head 31 and allowing piston 52 (described below) to move on shaft 84 (described below) independently of shaft 30.

Figure 2:
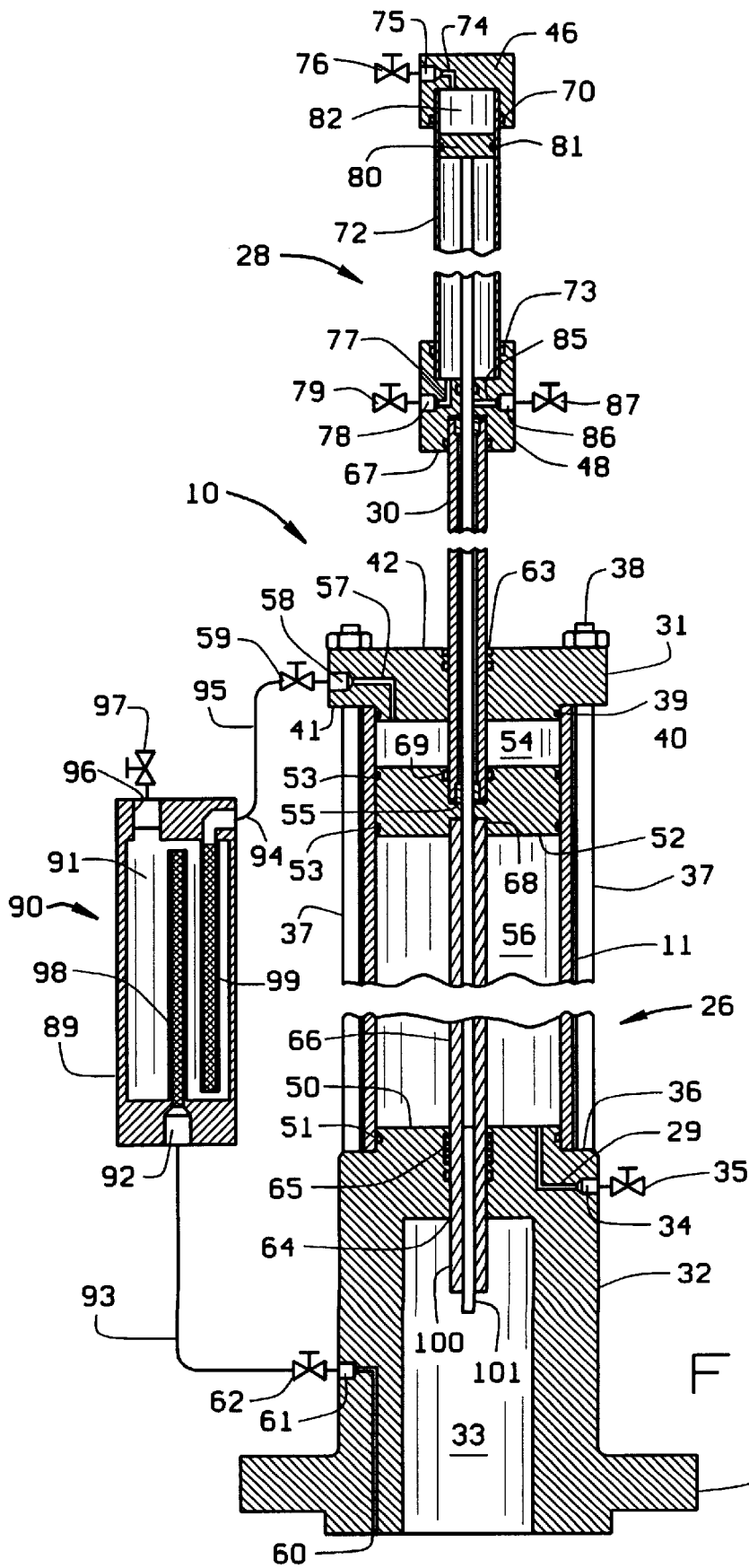
FIG. 2 is a front cross-sectional view of the dual cylinder insertion device.

Referring more specifically now to FIG. 2, the present dual cylinder/probe insertion device 10 is shown in greater detail. With respect to the primary cylinder structure 26, the cylinder assembly is as follows. The upper cylinder head 31 has a shelf portion 40 that defines a peripheral ledge 41. At least the corresponding end of the primary housing 11 is shaped to surround adjacently the peripheral edge of the shelf portion 40 and contact the ledge 41. An O-ring 39, disposed in the peripheral edge of the extended portion 40, provides a seal therebetween. The lower cylinder head 32 has a shelf portion 50 that defines a peripheral ledge 36. Again, at least the corresponding end of the primary housing 11 is shaped to surround adjacently the peripheral edge of the extended portion 50 and contact the ledge 36. An O-ring 51, disposed in the peripheral edge of the extended portion 50, provides a seal therebetween. The bolts 37 and corresponding nuts 38 hold the primary cylinder structure 26 together.

Disposed within the interior of the housing 11 is an axially movable piston 52 having a shape corresponding to the interior of the housing 11. The piston 52 includes O-rings 53 on a peripheral end thereof to create a seal between the interior surface of the housing 11 and the piston 52. The piston 52 also divides the interior cavity of the housing 11 into an upper variable volume chamber 54 and a lower variable volume chamber 56, each of whose volume is dependent upon the axial position of the piston 52 within the interior space of the housing 11.

The lower variable volume chamber 56 is in fluid communication with atmosphere via a conduit 29 and an outlet 34 in the lower cylinder head 32. Coupled to and in fluid communication with the outlet 34 is a valve 35. The conduit 34 and valve 35 allow the exhaustion or filling of the chamber 56, such as with a pressurized fluid. A conduit 57 in the upper cylinder head 31 provides fluid communication between the variable volume chamber 54 on one end thereof, and an outlet 58. A valve 59 is coupled to and in fluid communication with the outlet 58. The lower cylinder head 32 further includes a conduit 60 that provides fluid communication between an exterior of the lower end of the head 32 on one end thereof and an outlet 61 on another end thereof. Coupled to and in fluid communication with the outlet 61 is a valve 62. Generally, the conduit 60 provides fluid communication with the pipeline interior.

The lower cylinder head 32 includes a first axial bore 64 providing communication between the lower chamber 56 and a second, larger diameter axial bore 33. Fixedly attached to an O-ring lined opening 68 in the end of the piston 52 facing the lower chamber 56 is a hollow shaft 66. The hollow shaft 66 extends through the first axial bore 64 and into the second axial bore 33. The shaft 66 is axially dimensioned such that when the piston 52 is in an uppermost position, a portion of the shaft extends into the axial bore 33, and when the piston 52 is in a lowermost position the shaft extends into the pipeline interior. Because the shaft 66 is fixed to the piston 52, axial movement of the piston 52 effects axial movement of the shaft 66. Positioned peripherally relative to the first axial bore 64 are O-rings 65 or other packing means that provide a high pressure seal.

A second hollow shaft 30 has one end fixedly attached to an O-ring lined opening 69 in an upper end of the piston 52, extends through an O-ring lined opening 63 in the upper head 31 of the primary cylinder 26, and has the other end fixedly attached in an O-ring lined opening 67 in the lower head 48 of the secondary cylinder 28. Thus, as the piston 52 axially reciprocates, the hollow shafts 66 and 30 axially reciprocate therewith along with the entire secondary cylinder 28. As noted above, shaft 30 could be made stationary by sealingly affixing it to cylinder had 31 and letting piston 52 move independently of shaft 30. However, the movement of shaft 30 is a visible indication of movement of shaft 66 when the two are both connected to piston 52. This visible indication is usually desired for ready indication that shaft 66 is or is not inserted into the pipeline 22, 23.

With respect to the secondary cylinder 28, the cylinder structure assembly is as follows. The upper cylinder head 46 has an O-ringed opening 70 in which is disposed an end of the cylinder housing 72. The lower cylinder head 48 has an O-ring lined opening 73 in which the other end of the cylinder housing 72 is received. A secondary piston 80, having a peripheral O-ring 81, is disposed within the cylinder housing 72 and thus divides the interior of the cylinder housing 72 into an upper variable volume chamber 82 and a lower variable volume chamber 83. The volume of each chamber 82, 83 is variable depending on the axial position of the piston 80 within the cylinder housing 72.

The upper cylinder head 46 includes a conduit 74 terminating in an opening 75 at one end thereof that provides fluid communication between the upper variable volume chamber 82 and atmosphere through valve 76 which is coupled to the opening 75. The lower cylinder head 48 includes a first conduit 77 terminating in an opening 78 at one end thereof that provides fluid communication between the lower variable volume chamber 83 and atmosphere through a valve 79 which is coupled to the opening 78. The lower cylinder head 48 further includes a second conduit 85 terminating in an opening 86 at one end thereof that provides fluid communication between atmosphere and the interior of the hollow shaft 84 through a valve 87 which is coupled to the opening 86. The upper and lower variable volume chambers 82 and 83 may be filled and exhausted through selective control of the valves 76 and 79. The secondary cylinder 28 may be pneumatically or hydraulically operated in similar manner to that shown and described immediately below for cylinder 26.

Optionally, an external tank 90 may be used in conjunction with the present dual cylinder device 10 such that the primary piston 52 is actuated or assisted by, or operated with the pipeline fluid pressure. The external tank 90 is characterized by a housing 89 defining an internal chamber 91. A first opening 92 in one end of the housing 89 provides communication between the internal chamber 91 and atmosphere through a filter or screen 98. A conduit 93 is coupled to and in communication with the first opening 92 and the valve 62. The housing 89 also has a second opening 94 that provides communication between a conduit 95 and the internal chamber 91 through a filter or screen 99. A conduit 95 is coupled to and in communication with the opening 94 and the valve 59. The housing 89 further includes a third opening 96 which provides communication between atmosphere and the internal chamber 91 through a valve 97 which is coupled to the third opening 96. The valve 97 may be used as a vent or may be coupled to another conduit for any purpose.

When the valve 62 is open, the fluid pressure from the pipeline is allowed to flow into the conduit 93 and into the tank 90. If the valve 97 is open, the tank 90 will be vented. If the valve 97 is closed, and the valve 59 is open, either the upper variable volume chamber 54 will expand or contract depending on the pressure difference between the upper variable volume chamber 54 and the pipeline pressure.

Operation

The present dual cylinder/probe structure 10 operates in the following manner. Reference should specifically be made to FIG. 2. An object to be inserted into the pipeline, such as a plug, sensor, transducer or the like, collectively referred to as an insertion object (not shown), is attached to the end 100 of shaft 66 or end 101 of shaft 84. In the retracted position as depicted in FIG. 2, the piston 52 of the primary cylinder structure 26 is in an uppermost position within the cylinder housing 11. This causes the upper variable volume chamber 54 to be at a minimum volume, while the lower variable volume chamber 56 is at a maximum volume. The insertion object is thus sheltered within the bore 33. In order for the piston 52 to axially move into this position, the valve 59 is opened to allow the exhaustion of the variable volume chamber 54 while the valve 35 is opened, and coupled to a suitable pressure source, to allow the filling of the variable volume chamber 56.

Placement of the insertion object, if attached to end 100, into the pipeline is accomplished by filling the upper variable volume chamber 54 while exhausting the lower variable volume chamber 56. Thus the valve 35 is open to allow exhaustion and valve 59 is open and coupled to a suitable pressure source. If the pipeline pressure is used for this operation, and the external tank 90 is coupled as depicted in FIG. 2, the valve 62 is opened and valve 97 of the tank is closed to allow the pressure from the pipeline to enter the tank 90 and into the valve 59 via the respective conduits. If the tank 90 is used, then during exhaustion of the upper variable volume chamber 54, the valve 62 is closed and the valve 97 is opened.

During the placement operation, the upper variable volume chamber 54 is filled so that it is at a maximum volume and the lower variable volume chamber 56 is at a minimum. This causes the piston 52 to move axially downwardly within the cylinder housing 11. Since the lower shaft 66 is attached to the piston 52, the lower shaft 66 also moves axially downwardly, carrying the insertion object therewith and into the pipeline. As the piston 52 moves axially downwardly, the upper shaft 30 which is also attached to the piston 52 moves axially downwardly and carries with it the secondary cylinder structure 28. Of course, as the piston 52 moves axially upwardly, if the secondary cylinder is attached to piston 52, the secondary cylinder structure 28 moves axially upwardly as well. Thus, as the piston 52 moves, so does the secondary cylinder structure 28. The piston 80 and associated shaft 84 moves as well with the secondary cylinder structure 28.

The secondary cylinder structure 28 controls the axial movement of the shaft 84 in like manner to the primary cylinder structure 26 controls the movement of the shaft 66. The valve 76 controls the filling and exhaustion of the upper variable volume chamber 82 while the valve 79 controls the filling and exhaustion of the lower variable volume chamber 83. When the piston 80 is in the uppermost position, the upper variable volume chamber 82 is at a minimum while the lower variable volume chamber 83 is at a maximum. Conversely, when the piston 80 is in a lowermost position, the upper variable volume chamber 82 is at a maximum while the lower variable volume chamber 83 is at a minimum. Axial movement of the piston 80 effects axial movement of the shaft 84 since the shaft 84 is coupled to the piston 80.

After the primary piston has moved the insertion object into the pipeline, and the secondary cylinder structure 28 has moved into a lowermost position relative to the primary cylinder structure 26, the shaft 84 can be axially positioned by movement of the piston 80. This can effect a second operation upon the insertion object. Wires can extend through the hollow shaft or the shaft may be pressurized. In FIG. 1 the end 101 of shaft 84 is shown extending from the end 100 of shaft 66 while piston 81 is in its upper position. It will be recognized that end 101 could be much higher and well up within shaft 66 when piston 81 is in its upper position depending on the desired use for the tool.

It can thus be seen that when the secondary cylinder structure 28 moves with the primary piston 52, the operation of the shaft 84 is nevertheless controlled by the secondary piston 80.

What is claimed is:

1. A pipeline insertion device adapted to be mounted to a pipeline, the insertion device comprising:

a lower cylinder head;

a first cylinder structure mounted on said lower cylinder head, said first cylinder structure defined by a first housing and having a first, axially movable piston within a first chamber defined by the first housing, the first piston having a bore therethrough, the first cylinder structure further having a first hollow shaft coupled to the first piston and movable therewith, the first hollow shaft adapted to extend beyond the first housing and into the pipeline upon selective movement of the first piston;

a second cylinder structure defined by a second housing and having a second, axially movable piston within a second chamber defined by the second housing, the second cylinder structure coupled to the first piston by a second hollow shaft, the second cylinder structure having a third hollow shaft coupled to the second piston and extending beyond the second cylinder housing, the third hollow shaft further extending through the second hollow shaft, the piston bore, and the first hollow shaft, and adapted to extend beyond the first cylinder housing upon selective movement of the second piston; and a pipeline insertion element mounted on an end of said third hollow shaft opposite said second piston, for selective insertion of said third hollow shaft and said pipeline insertion element into the pipeline upon actuation of said first cylinder structure and said second cylinder structure.

2. The pipeline insertion device of claim 1, wherein the first piston defines upper and lower variable volumes within the first chamber, the first cylinder structure including a first port providing communication between the upper variable volume and atmosphere, and a second port providing communication between the lower variable volume and atmosphere, and wherein the second piston defines upper and lower variable volumes within the second chamber, the second cylinder structure including a first port providing communication between the upper variable volume and atmosphere, and a second port providing communication between the lower variable volume and atmosphere.

3. The pipeline insertion device of claim 2, wherein the second cylinder structure further includes a third port providing communication between atmosphere and an interior of the third hollow shaft.

4. The pipeline insertion device of claim 1, wherein the first cylinder structure includes mounting flanges adapted to be coupled to the pipeline.

5. The pipeline insertion device of claim 4, wherein the first cylinder structure includes a third port providing communication between an interior of the pipeline and atmosphere.

6. An insertion device adapted to be coupled to a pipeline, the insertion device comprising:

a lower cylinder head;

a primary cylinder mounted on said lower cylinder head; having a primary housing defining a primary chamber;

a primary, axially movable piston disposed in the primary chamber and dividing the primary chamber into an upper variable volume chamber and a lower variable volume chamber, the primary piston having a bore therethrough;

a lower primary hollow shaft coupled to the primary piston and adapted to move therewith, the lower primary hollow shaft extending through the primary housing and adapted to extend into the pipeline upon movement of the primary piston;

an upper primary hollow shaft coupled to the primary piston and adapted to move therewith, the upper primary hollow shaft extending through the primary housing;

a secondary cylinder having a secondary housing and defining a secondary chamber, the secondary cylinder coupled to the upper primary hollow shaft;

a secondary, axially movable piston disposed in the secondary chamber and dividing the secondary chamber into an upper variable volume chamber and a lower variable volume chamber;

a secondary hollow shaft coupled to the secondary piston and extending through the secondary housing, the upper primary hollow shaft, the piston bore, and the lower primary hollow shaft; and a pipeline insertion element mounted on a end of said secondary hollow shaft opposite sail secondary piston, for selective insertion of said secondary hollow shaft and said pipeline insertion element into the pipeline upon actuation of said primary cylinder and said secondary cylinder.

7. The insertion device of claim 6, further comprising:

a first port in the primary housing providing communication between atmosphere and the upper variable volume chamber thereof;

a second port in the primary housing providing communication between atmosphere and the lower variable volume chamber thereof;

a third port in the secondary housing providing communication between atmosphere and the upper variable volume chamber thereof; and a fourth port in the secondary housing providing communication between atmosphere and the lower variable volume chamber thereof.

8. The insertion device of claim 7, further comprising:

a fifth port in the primary housing providing communication between atmosphere and an interior of the pipeline; and a sixth port in the secondary housing providing communication between atmosphere and an interior of the third hollow shaft.

9. A pipeline insertion device adapted to be mounted to a pipeline, the insertion device comprising:

a lower cylinder head;

the first cylinder structure mounted on said lower cylinder head defined by a first housing and having a first axial moveable piston within a first chamber defined by the first housing, the first piston having a bore therethrough, the first cylinder structure further having a first hollow shaft coupled to the first piston and moveable therewith, the first hollow shaft adapted to extend beyond the first housing and into the pipeline upon selective movement of the first piston; and a second cylinder structure defined by a second housing and having a second axial moveable piston within a second chamber defined by the second housing, the second cylinder structure coupled to an upper cylinder head of the second cylinder by a second hollow shaft, the second cylinder structure having a third hollow shaft coupled to the second piston and extending beyond the second cylinder housing, the third hollow shaft further extending through the second hollow shaft, the piston bore, and the first hollow shaft, and adapted to extend beyond the first cylinder housing upon selective movement of the second piston, a pipeline insertion element mounted on a end of said third hollow shaft opposition said second piston, for selective insertion of said third hollow shaft and said pipeline insertion element into the pipeline upon actuation of said first cylinder structure and said second cylinder structure.

* * * * *